United States Patent
Nagai et al.

(10) Patent No.: US 9,159,998 B2
(45) Date of Patent: Oct. 13, 2015

(54) POSITIVE ELECTRODE ACTIVE MATERIAL FOR LITHIUM SECONDARY BATTERY, AND USE THEREOF

(75) Inventors: Hiroki Nagai, Nagoya (JP); Satoshi Goto, Aichi-ken (JP); Hidekazu Hiratsuka, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 691 days.

(21) Appl. No.: 13/393,621

(22) PCT Filed: Sep. 4, 2009

(86) PCT No.: PCT/JP2009/065473
§ 371 (c)(1),
(2), (4) Date: Mar. 1, 2012

(87) PCT Pub. No.: WO2011/027455
PCT Pub. Date: Mar. 10, 2011

(65) Prior Publication Data
US 2012/0161069 A1 Jun. 28, 2012

(51) Int. Cl.
*H01M 4/13* (2010.01)
*H01M 4/505* (2010.01)
*H01M 4/525* (2010.01)
*H01M 10/052* (2010.01)
*C01G 53/00* (2006.01)

(52) U.S. Cl.
CPC .............. *H01M 4/505* (2013.01); *C01G 53/50* (2013.01); *H01M 4/525* (2013.01); *H01M 10/052* (2013.01); *C01P 2002/52* (2013.01); *C01P 2004/61* (2013.01); *C01P 2006/12* (2013.01); *C01P 2006/40* (2013.01); *Y02E 60/122* (2013.01); *Y02T 10/7011* (2013.01)

(58) Field of Classification Search
USPC ............ 428/402; 429/231.1, 231.3, 223, 224, 429/231.95
See application file for complete search history.

(56) References Cited

U.S. PATENT DOCUMENTS

| 2005/0014065 A1 | 1/2005 | Jung et al. |
| 2005/0158546 A1 * | 7/2005 | Shizuka ........................ 428/402 |
| 2009/0011334 A1 * | 1/2009 | Shizuka et al. ............... 429/223 |

FOREIGN PATENT DOCUMENTS

| CN | 100433422 | 11/2008 |
| JP | 2002-151071 | 5/2002 |
| JP | 2005-19149 | 1/2005 |
| JP | 2005-251717 | 9/2005 |
| JP | 2006-107845 | 4/2006 |
| JP | 2006-253119 | 9/2006 |
| JP | 2007-220475 | 8/2007 |
| JP | 2008-47306 | 2/2008 |
| JP | 4316656 | 8/2009 |
| KR | 100815583 | 3/2008 |

OTHER PUBLICATIONS

Translation of the International Preliminary Report on Patentability for Appl. No. PCT/JP2009/065473 dated Apr. 19, 2012.
International Search Report in International Application No. PCT/JP2009/065473; Mailing Date: Nov. 10, 2009.

* cited by examiner

*Primary Examiner* — Monique Peets
(74) *Attorney, Agent, or Firm* — Finnegan, Henderson, Farabow, Garrett & Dunner, LLP

(57) ABSTRACT

A positive electrode active material provided in the present invention is characterized in that it is substantially formed of a lithium nickel cobalt manganese composite oxide and that a molar content ratio ($Ni^{III}/Ni^{II}$) of bivalent nickel atoms ($Ni^{II}$) and trivalent nickel atoms ($Ni^{III}$) of nickel atoms constituting the composite oxide is $0.15 \leq (Ni^{III}/Ni^{II}) \leq 0.95$.

5 Claims, 5 Drawing Sheets

POSITIVE ELECTRODE ACTIVE MATERIAL FOR LITHIUM SECONDARY BATTERY, AND USE THEREOF

CROSS-REFERENCE TO RELATED APPLICATIONS

This application is a national phase application of International Application No. PCT/JP2009/065473, filed Sep. 4, 2009, the contents of which are incorporated herein by reference.

TECHNICAL FIELD

The present invention relates to a positive electrode active material that can be used in a lithium secondary battery, and more particularly to a positive electrode active material comprising a lithium composite oxide composition, and a process for producing the same. Moreover, the present invention relates to a lithium secondary battery equipped with a positive electrode material comprising said positive electrode active material and the use thereof.

BACKGROUND ART

Lithium secondary batteries (typically lithium-ion batteries), nickel-metal hydride batteries, and other secondary batteries have become more important recently as a vehicle-mounted electric power source, as well as for use in personal computers and portable devices. In particular, it is expected that lithium secondary batteries, which are lightweight and can provide high energy density, can be preferably used as a high output electrical power source for vehicles.

A lithium composite oxide is generally used as the positive electrode active material comprising the positive electrode of a lithium secondary battery. A composite oxide comprising lithium, nickel, cobalt, and manganese (hereafter, "lithium nickel cobalt manganese composite oxide") as constituent metallic elements, for example, is known as one such type of composite oxide. A lithium nickel cobalt manganese composite oxide, which has a stratified rock salt type structure generally represented by $Li(Ni_{1/3}Co_{1/3}Mn_{1/3})O_2$, has a lattice structure in which bivalent nickel, trivalent cobalt, and tetravalent manganese are regularly arranged, and it can serve as a positive electrode active material with a high level of both structural and thermal stability.

Patent documents 1 and 2 can be noted as examples of prior art relevant to this kind of lithium nickel cobalt manganese composite oxide. These patent documents list a variety of ways for improving the characteristics of a lithium nickel cobalt manganese composite oxide that is used as the positive electrode active material in lithium secondary batteries. For example, these patent documents indicate that improvements in battery performance such as output characteristics, etc., can be obtained by using a lithium nickel cobalt manganese composite oxide wherein the atomic ratio of lithium, nickel, cobalt, and manganese is restricted to a given range as the positive electrode active material.

CITATION LIST

Patent Literature

Patent Document 1: Japanese Patent Application Publication No. 2006-253119
Patent Document 2: Japanese Patent Application Publication No. 2007-220475

DISCLOSURE OF THE INVENTION

However, the technical investigations described in the abovementioned patent documents cannot be considered sufficient and, for example, there is room for further investigation of the molar composition ratio of lithium to the other metallic elements, and in particular the molar composition ratio of lithium to nickel, as well as the content ratio in the compound as a whole, etc.

Therefore, the present invention was created after taking into account the current state of development in positive electrode active materials comprising a lithium nickel cobalt manganese composite oxide for lithium secondary batteries, and an object of the present invention is to provide a lithium nickel cobalt manganese composite oxide with higher performance than in the past that is suitable for use as the positive electrode active material in a lithium secondary battery, and a process for producing the same. A further object of the present invention is to provide a positive electrode active material comprising mainly this kind of lithium nickel cobalt manganese composite oxide for a lithium secondary battery, and a process for producing the same. Moreover, a further object of the present invention is to provide a positive electrode for a lithium secondary battery featuring a positive electrode active material comprising mainly this kind of lithium nickel cobalt manganese composite oxide, and a lithium secondary battery equipped with said positive electrode.

The present invention provides a positive electrode active material with the composition for lithium secondary batteries disclosed below. More specifically, one positive electrode active material disclosed herein is a positive electrode active material for a lithium secondary battery formed of substantially a lithium nickel cobalt manganese composite oxide of a stratified structure with lithium, nickel, cobalt, and manganese as essential constituent elements thereof, wherein a molar content ratio ($Ni^{III}/Ni^{II}$) of bivalent nickel atoms (hereafter, $Ni^{II}$) and trivalent nickel atoms (hereafter, $Ni^{III}$) among nickel atoms constituting the abovementioned composite oxide is $0.15 \leq (Ni^{III}/Ni^{II}) \leq 0.95$. This molar content ratio is preferably $0.2 \leq (Ni^{III}/Ni^{II}) \leq 0.95$ and more preferably $0.25 \leq (Ni^{III}/Ni^{II}) \leq 0.95$.

Although nickel atoms with a valence of 2 ($Ni^{II}$) are generally the most stable as nickel atoms (nickel ions) constituting a lithium nickel cobalt manganese composite oxide, the inventors discovered that the electron conductivity improves in accordance with the combined presence of trivalent nickel atoms (trivalent nickel ions) and bivalent nickel atoms (bivalent nickel ions) at a relatively high content ratio as indicated by the above molar content ratio ($Ni^{III}/Ni^{II}$). As a result, the internal resistance can be reduced in batteries with this positive electrode active material.

Moreover, the inventors adjusted the molar ratios in mixtures of lithium and other constituent metallic elements (the term constituent metallic element used herein can include metalloids (semimetals) such as boron) within a given range during the production of a lithium nickel cobalt manganese composite oxide of a stratified structure comprising lithium, nickel, cobalt, and manganese as the essential constituent elements, and they discovered that the composite oxide could be produced efficiently and with a high abundance of trivalent nickel atoms by suitably adjusting the calcining temperature range.

In other words, the positive electrode active material for a lithium secondary battery disclosed herein comprises, as its main constituent element, a lithium nickel cobalt manganese composite oxide of the above stratified structure wherein the molar content ratio ($Ni^{III}/Ni^{II}$) of bivalent nickel atoms ($Ni^{II}$) to trivalent nickel atoms ($Ni^{III}$) is preferably 0.15 or higher, more preferably 0.2 or higher, and most preferably 0.25 or higher, and it typically contains trivalent nickel atoms (nickel ions) in a ratio such that $0.25 \leq (Ni^{III}/Ni^{II}) \leq 0.95$.

A positive electrode active material for a lithium secondary battery can be provided thereby that has higher electron conductivity than a positive electrode active material comprising only bivalent nickel atoms or a prior art lithium nickel cobalt manganese composite oxide wherein 90 atomic percent or more of all nickel atoms in the material are bivalent nickel atoms.

Preferably, the above composite oxide is defined as a lithium nickel cobalt manganese composite oxide represented by the following formula:

$$Li^x(Ni^{II}_y Ni^{III}_z)_a Co_b Mn_c Me_d O_2 \quad (1)$$

(wherein a, b, c, and d are numbers that satisfy all of the following relationships:

$0.9 \leq a+b+c+d \leq 1.1$;
$0.9 \leq b/a \leq 1.1$;
$0.9 \leq c/b \leq 1.1$;
$0.9 \leq a/c \leq 1.1$; and
$0 \leq d \leq 0.1$;

x is a number that satisfies the relationship $1.07 \leq x/(a+b+c+d) \leq 1.2$;

y and z are numbers that satisfy the relationship $0.15 \leq z/y \leq 0.95$; and Me is either absent, or is one or more elements selected from a group consisting of Mg, Sr, Ti, Zr, V, Nb, Mo, W, B, and Al).

It is particularly preferable for x in Formula (1) to be a number that satisfies the relationship $1.1 \leq x/(a+b+c+d) \leq 1.2$.

With this kind of value for x/(a+b+c+d), in other words, when the molar content ratio (atomic ratio) between lithium (Li) and the total amount of the other constituent metallic elements (the term constituent metallic element used herein can include metalloids (semimetals) such as boron) (hereafter, "$M_{all}$") comprising the lithium nickel cobalt manganese composite oxide (i.e., the ratio ($Li/M_{all}$)) is between 1.07 and 1.2 (more preferably between 1.1 and 1.2), it is possible to provide a positive electrode active material with excellent electron conductivity. Moreover, it is more preferable if y and z are numbers that satisfy the relationship $0.2 \leq z/y \leq 0.95$. It is particularly preferable if y and z are numbers that satisfy the relationship $0.25 \leq z/y \leq 0.95$.

Furthermore, in the chemical formula for the lithium nickel cobalt manganese composite oxide disclosed herein, the composition ratio for oxygen (O) is represented by 2 as a matter of convenience, but is not limited thereto, and small changes in the composition (typically falling in a range between 1.95 and 2.05) are permitted.

In addition, the present invention provides a process for most suitably producing the kind of positive electrode active material described above. More specifically, the production process of the present invention is a process for producing a positive electrode active material for a lithium secondary battery formed of substantially a lithium nickel cobalt manganese composite oxide of a stratified structure having lithium, nickel, cobalt, and manganese as essential constituent elements.

In concrete terms, the process for producing a positive electrode active material disclosed herein includes a step of preparing a starting material for producing the above composite oxide containing a lithium source, a nickel source, a cobalt source, and a manganese source (typical examples of these sources are metallic compounds such as various metal salts), and in this case the starting material is prepared such that the molar ratio ($Li/M_{all}$) of lithium (Li) to the total amount of all other constituent metallic elements (the term constituent metallic element used herein can include metalloids (semimetals) such as boron) ($M_{all}$) is $1.07 \leq Li/M_{all} \leq 1.2$; and a step of producing the abovementioned composite oxide wherein at least some of the nickel atoms are trivalent nickel atoms ($Ni^{III}$) by calcining the starting material under conditions such that the maximum calcining temperature is set in a range between 700° C. and 1000° C.

A positive electrode active material with good electron conductivity can be produced by this production process for the composition.

Preferably, the abovementioned composite oxide is a lithium nickel cobalt manganese composite oxide represented by the following formula:

$$Li_x(Ni^{II}_y Ni^{III}_z)_a Co_b Mn_c Me_d O_2 \quad (1)$$

wherein a, b, c, and d are numbers that satisfy all of the following relationships:

$0.9 \leq a+b+c+d \leq 1.1$;
$0.9 \leq b/a \leq 1.1$;
$0.9 \leq c/b \leq 1.1$;
$0.9 \leq a/c \leq 1.1$; and
$0 \leq d \leq 0.1$;

x is a number that satisfies the relationship $1.07 \leq x/(a+b+c+d) \leq 1.2$;

y and z are numbers that satisfy the relationship $0.15 \leq z/y \leq 0.95$; and Me is either absent, or is one or more elements selected from a group consisting of Mg, Sr, Ti, Zr, V, Nb, Mo, W, B, and Al, and the starting material is prepared to contain a lithium source, a nickel source, a cobalt source, and a manganese source at a molar ratio such that the composite oxide represented by Formula (1) is produced by the above calcination.

In particular, x in Formula (1) preferably is a number that satisfies the relationship $1.1 \leq x/(a+b+c+d) \leq 1.2$.

With this kind of value for x/(a+b+c+d), in other words, when the molar ratio (atomic ratio) ($Li/M_{all}$) between lithium (Li) and the total amount of other constituent metallic elements ($M_{all}$) comprising the lithium nickel cobalt manganese composite oxide is established between 1.07 and 1.2 (more preferably between 1.1 and 1.2), the abundance of trivalent nickel atoms ($Ni^{III}$) can be easily increased. As a result a positive electrode active material with excellent electron conductivity can be most suitably produced.

In an even more preferred mode of the process for producing the positive electrode active material disclosed herein, the above starting materials are calcined at an intermediate calcining temperature established in the temperature range of 700° C. or higher but less than 800° C., and then the temperature is increased and calcining is carried out up to a maximum calcining temperature in the temperature range between 800° C. and 1000° C.

This kind of multistage calcining schedule enables the abundance of trivalent nickel atoms ($Ni^{III}$) among the nickel atoms in the calcined substance (i.e., the lithium nickel cobalt manganese composite oxide) to be easily increased.

Moreover, the present invention provides a lithium secondary battery (typically a lithium-ion battery) comprising a positive electrode containing the positive electrode active material disclosed herein (typically a positive electrode active material produced by any of the production processes disclosed herein).

Any lithium secondary batteries disclosed herein have favorable electron conductivity and low internal resistance.

As a result, performance suitable for a battery to be mounted in a vehicle that requires a particularly high rate of charge and discharge is provided thereby. Thus, the present invention also provides a vehicle equipped with any of the lithium secondary batteries disclosed herein. In particular, the present invention provides a vehicle (e.g., an automobile) equipped with said lithium secondary battery as a power source (typically, as a power source for a hybrid vehicle or an electric vehicle).

DESCRIPTION OF EMBODIMENTS

Figure 1:
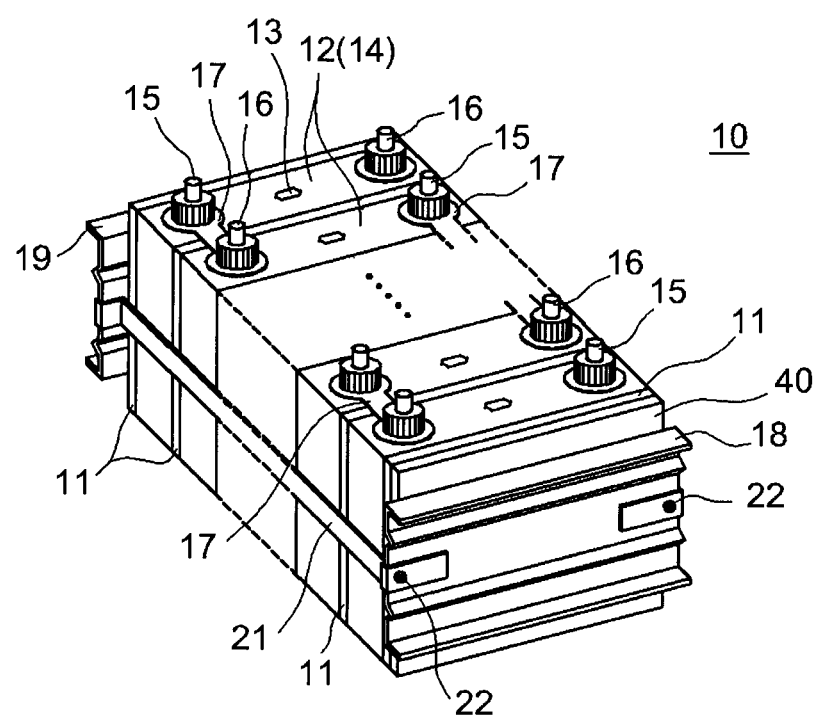
FIG. 1 is a perspective view schematically showing a battery pack involving one embodiment of the present invention.

Preferred embodiments of the present invention are described below. It should be noted that matters necessary for carrying out the present invention other than those specifically referred to in the description are understood to be matters of design for a person skilled in the art based on the prior art in this field. The present invention can be carried out on the basis of the content disclosed herein and common technical knowledge in this field.

The positive electrode active material provided by the present invention is a positive electrode active material for a lithium secondary battery comprising substantially a lithium nickel cobalt manganese composite oxide of a stratified structure having lithium (Li), nickel (Ni), cobalt (Co), and manganese (Mn) as essential constituent elements. Moreover, in addition to bivalent nickel atoms ($Ni^{II}$) which are generally the most stable in compounds, the nickel atoms comprising this composite oxide contain a relatively high ratio of trivalent nickel atoms ($Ni^{III}$), which generally are not present in compounds. The molar ratio ($Ni^{III}/Ni^{II}$) of trivalent nickel atoms ($Ni^{III}$) to bivalent nickel atoms ($Ni^{II}$) is preferably 0.15 or higher, more preferably 0.2 or higher, and most preferably 0.25 or higher.

The overlap of electron orbits in the spaces between the nickel (Ni) atoms and oxygen (O) atoms in the molecular structure can be increased with a lithium nickel cobalt manganese composite oxide containing trivalent nickel atoms ($Ni^{III}$) in this kind of molar composition ratio. As a result, the electron conductivity can be remarkably improved over a lithium nickel cobalt manganese composite oxide that does not contain trivalent nickel atoms ($Ni^{III}$). Therefore, the internal resistance (specifically the electrical resistance of the positive electrode active material) of a lithium secondary battery can be decreased by using a lithium nickel cobalt manganese composite oxide containing trivalent nickel atoms ($Ni^{III}$) with this kind of molar content ratio as the positive electrode active material.

For example, preferably $Ni^{III}/Ni^{II}$ of the lithium nickel cobalt manganese composite oxide provided by the present invention satisfies the relationship $0.15 \leq (Ni^{III}/Ni^{II}) \leq 0.95$, more preferably $0.2 \leq (Ni^{III}/Ni^{II}) \leq 0.95$, and most preferably $0.25 \leq (Ni^{III}/Ni^{II}) \leq 0.95$. On the other hand, not only is the production (synthesis) of a lithium nickel cobalt manganese composite oxide wherein $Ni^{III}/Ni^{II}$ exceeds 0.95 extremely difficult, but it also provides almost no advantage because the rate of improvement in electron conductivity levels off. Furthermore, such a composite oxide is undesirable because an excess of residual alkaline components (typically ionic compounds containing lithium ions such as lithium carbonate) can be present. If excess residual alkaline components are present in the positive electrode active material, the decomposition of the electrolyte solution by these excess alkaline components in a lithium secondary battery constructed using said positive electrode active material can cause the generation of gases in the battery.

Preferably the relationship $0.15 \leq (Ni^{III}/Ni^{II}) \leq 0.95$ (and in particular $0.25 \leq (Ni^{III}/Ni^{II}) \leq 0.95$) is also satisfied from the standpoint of minimizing excess alkaline components. For example, a lithium nickel cobalt manganese composite oxide wherein $Ni^{III}/Ni^{II}$ is between 0.15 and 0.6 (particularly between 0.25 and 0.6) is preferable from the standpoint that both improvements to electron conductivity and suppression of gas generation are realized.

The lithium nickel cobalt manganese composite oxide disclosed herein contains nickel, cobalt, and manganese as the primary constituent metallic elements other than lithium, but part of these essential metallic elements can be replaced by one or more different metallic or metalloid (semimetal) elements. For example, periodic table elements belonging to Group 2 (alkaline earth metals such as magnesium, calcium, and strontium), Group 4 (transition metals such as titanium and zirconium), Group 5 (transition metals such as vanadium and niobium), Group 6 (transition metals such as molybdenum and tungsten), Group 8 (transition metals such as iron), Group 9 (transition metals such as rhodium), Group 10 (transition metals such as palladium and platinum), Group 11 (transition metals such as copper), Group 12 (transition metals such as zinc), and Group 13 (the metalloid boron or a metal such as aluminum) can be contained therein.

Preferably, one or more elements (typically two or three elements) selected from among magnesium (Mg), strontium (Sr), titanium (Ti), zirconium (Zr), vanadium (V), niobium (Nb), molybdenum (Mo), tungsten (W), boron (B), and aluminum (Al) are selected. Ti or Zr is particularly preferable.

These additional constituent elements are added such that the total amount of these additional elements combined with the nickel, cobalt, and manganese is 20 atomic % or less, preferably 10 atomic % or less. Alternatively, these additional elements can be omitted.

A preferable lithium nickel cobalt manganese composite oxide comprising the positive electrode active material disclosed herein is a lithium nickel cobalt manganese composite oxide as indicated below in Formula (1).

$$Li_x(Ni^{II}_y Ni^{III}_z)_a Co_b Mn_c Me_d O_2 \qquad (1)$$

wherein a, b, c, and d are numbers that satisfy all of the following relationships:
0.9≤a+b+c+d≤1.1;
0.9≤b/a≤1.1;
0.9≤c/b≤1.1;
0.9≤a/c≤1.1; and
0.9≤d≤0.1; and
x is a number that satisfies the relationship 1.07≤x/(a+b+c+d)≤1.2. Preferably a+b+c=1. Moreover, a=b=c is particularly preferable. Moreover, y and z are values that satisfy the relationship 0.15≤z/y≤0.95, and preferably y and z are numbers that satisfy the relationship 0.2≤z/y≤0.95 (typically 0.25≤z/y≤0.95). Me is either absent or is one or more elements selected from a group consisting of Mg, Sr, Ti, Zr, V, Nb, Mo, W, B, and Al.

For example, a preferred embodiment of the composite oxide that does not contain Me in Formula (1) above (i.e. d=0) can be represented by Formula (2) below.

$$Li_x(Ni^{II}_y Ni^{III}_z)_{1/3} Co_{1/3} Mn_{1/3} O_2 \qquad (2)$$

wherein x is a number that satisfies the relationship 1.07≤x≤1.2 and preferably 1.1≤x≤1.2. Moreover, y and z are values that satisfy the relationship 0.15≤z/y≤0.95, preferably 0.2≤z/y≤0.95, and more preferably 0.25≤z/y≤0.95 (typically 0.25≤z/y≤0.6).

The lithium nickel cobalt manganese composite oxide disclosed herein can be obtained in the same way as conventional composite oxides of a similar variety by mixing in a given molar ratio from several sources (compounds) suitably selected depending on the constituent elements of the composite oxide and the atomic ratios thereof, and then calcining said composite oxide by a suitable means at a given temperature. After calcining, a positive electrode active material powder of a desired mean particle size (e.g., the median size) and particle size distribution can typically be prepared by powdering or granulation by a suitable means.

For example, lithium compounds such as lithium carbonates and lithium hydroxides can be used as the lithium source. Moreover, as sources of nickel, cobalt, manganese and other compounds serving as a metal source (e.g., titanium compounds and metalloid compounds (typically boron compounds)), the hydroxides, oxides, various salts (e.g., carbonates), halogenides (e.g., fluorides), etc., that comprise these constituent elements can be selected. Examples of a nickel source include nickel carbonates, nickel oxides, nickel sulfates, nickel nitrates, nickel hydroxides, nickel oxyhydroxides, etc., although the source is not particularly limited herein. Examples of cobalt sources include cobalt carbonates, cobalt oxides, cobalt sulfates, cobalt nitrates, cobalt hydroxides, cobalt oxyhydroxides, etc. Moreover, examples of manganese sources include manganese carbonates, manganese oxides, manganese sulfates, manganese nitrates, manganese hydroxides, manganese oxyhydroxides, etc.

Alternatively, composites that can be used as a source of several elements (e.g., composite oxides containing nickel, cobalt, and manganese) can be used in place of separate and different compounds as the respective sources of nickel, cobalt, and manganese.

As stated above, the lithium nickel cobalt manganese composite oxide disclosed herein contains a given ratio of trivalent nickel atoms ($Ni^{III}$), and preparation by mixing each of the sources such that the molar ratio ($Li/M_{all}$) between lithium (Li) and the total amount of all other constituent metallic elements (the term constituent metallic element used herein can include metalloids (semimetals) such as boron) ($M_{all}$) is 1.07≤$Li/M_{all}$≤1.2 is noted as one example of a suitable condition for producing said trivalent nickel atoms. Preferably, a relative excess of lithium source can be mixed with the other sources such that the molar ratio between lithium (Li) and the total amount of the constituent metallic elements other than lithium ($M_{all}$) is 1.1≤$Li/M_{all}$≤1.2. Hence, when the mixture of all of the sources (i.e. the starting material) is calcined, a given amount of the nickel atoms that are contained in said calcined material will be trivalent nickel atoms.

On the other hand, adding such a large amount of the lithium source that the molar ratio ($Li/M_{all}$) between Li and $M_{all}$ greatly exceeds 1.2 is undesirable because excess lithium components (alkaline components) that do not constitute the lithium nickel cobalt manganese composite oxide of a stratified structure will remain in the positive electrode active material. In other words, it is undesirable because decomposition of the electrolyte solution brought about by the excess of alkaline components in a lithium secondary battery constructed using said positive electrode active material can cause gas generation.

As noted above, after preparing the starting material (a mixture) by mixing all of the various source compounds such that $Li/M_{all}$ is 1.07 or higher, the starting material is calcined at a suitable temperature. It is desirable for calcining to be performed in an environment that is more oxygen-rich than the atmosphere. Calcining temperature is one important factor from the perspective of increasing the ratio of trivalent nickel atoms.

Preferably the maximum calcining temperature is set in the range between 700° C. and 1000° C. in an oxidizing atmosphere. Thereby, a change in the valence of a portion of the nickel atoms occurs during calcining, and a lithium nickel cobalt manganese composite oxide containing a high percentage of trivalent nickel atoms can be produced. Preferably the prepared starting material is first calcined at an intermediate calcining temperature established in the temperature range of 700° C. or higher but less than 800° C. and then is calcined by increasing to the maximum calcining temperature established in a temperature range between 800° C. and 1000° C.

The abundance ratio of trivalent nickel atoms in the calcined material (i.e. the lithium nickel cobalt manganese composite oxide) can be adjusted by calcining the starting materials with this kind of multistage calcining schedule.

Preferably, the temperature should be increased from room temperature to the temperature region of 700° C. or higher but less than 800° C. over a period of about 1 hour to 10 hours. Then, calcining is performed for about 1 hour to 24 hours in this intermediate calcining temperature region (first calcining process). Next, the temperature should be increased to the temperature region between 800° C. and 1000° C. over a period of about 1 hour to 10 hours. Then, calcining is performed for about 1 hour to 24 hours in the maximum calcining temperature region (second calcining process). Moreover, the effect of multistage calcining is best obtained when the temperature difference between the first calcining temperature and the second calcining temperature is at least 50° C. or higher and preferably 100° C. or higher to enable the production of a suitable lithium nickel cobalt manganese composite oxide.

A microparticulate lithium nickel cobalt manganese composite oxide with a mean particle size of about 1 μm to 25 μm can be obtained by grinding with a mill, etc., and suitably sorting, preferably after cooling, of the lithium nickel cobalt manganese composite oxide obtained by calcining according to kind of calcining schedule disclosed above. It should noted that that mean particle size refers to median size (d50) herein, and measurement thereof can be easily performed with various commercially available particle size distribution measurement devices based on laser diffraction/dispersion.

The lithium nickel cobalt manganese composite oxide disclosed herein has excellent electron conductivity. Normally an extremely low volume resistivity for this type of oxide is displayed wherein the powder resistivity (volume resistivity) measured under a pressure of 40 MPa using a commercially available powder resistivity measurement device is $1\times10^5$ Ω·cm or lower (e.g., $1\times10^3$ Ω·cm to $1\times10^5$ Ω·cm) and preferably $1\times10^4$ Ω·cm or lower (typically $1\times10^3$ Ω·cm to $1\times10^4$ Ω·cm). This enables the lithium nickel cobalt manganese composite oxide disclosed herein to be suitably used as the positive electrode active material of a lithium secondary battery (typically a lithium-ion battery).

Moreover, the lithium secondary battery can be constructed using conventional materials and processes provided the positive electrode active material disclosed herein is used.

For example, carbon blacks such as such as acetylene black and Ketjen black, and other carbon material powders (such as graphite) can be mixed with the powder comprising the lithium nickel cobalt manganese composite oxide disclosed herein (positive electrode active material powder) as a conductive material. Moreover, binders such as polyvinylidene flouride (PVDF), styrene-butadiene rubber (SBR), polytetrafluoroethylene (PTFE), and carboxymethyl cellulose (CMC) can be added in addition to the positive electrode active material and conductive material. A paste (including the concept of slurry or ink, here and hereafter) of the composition for forming the positive electrode active material (hereinafter, also called "paste for forming a positive electrode active material layer") can be prepared by dispersing and mixing these ingredients in a suitable dispersive medium. A positive electrode for a lithium secondary battery can be produced by applying a suitable amount of this paste to a positive current collector preferably constituting aluminum or an alloy having aluminum as the main component thereof, and then drying and pressing the same.

In contrast, the negative electrode that serves as the counter electrode for a lithium secondary battery can be produced by conventional methods. For example, a material capable of absorbing and desorbing lithium ions can be used as the negative electrode active material. Typical examples include carbon material powders comprising graphite, etc. Graphite particles in particular can serve as a negative electrode active material suited for rapid charging and discharging (e.g., high output discharging) because they have a small particle size and a large surface area per unit volume.

Then, in the same manner as with the positive electrode, a paste of a composition for a forming negative electrode active material layer (hereafter, "paste for forming a negative electrode active material layer") can be prepared by dispersing and mixing the powdered material along with a suitable binder in a suitable dispersive medium. A negative electrode for a lithium secondary battery can be produced by applying a suitable amount of this paste to a negative current collector preferably comprising copper or nickel, or an alloy thereof, and then drying and pressing the same.

A separator can be used in the conventional manner in a lithium secondary battery using the lithium nickel cobalt manganese composite oxide of the present invention. For example, a porous sheet comprising polyolefin resin (porous film), etc., can be used.

Moreover, a nonaqueous electrolyte (typically an electrolyte solution) similar to those previously used in lithium secondary batteries can be used as the electrolyte with no particular limitation herein. Typically, this is a composition containing a supporting electrolyte in a suitable nonaqueous medium. For example, one or more substances selected from a group consisting of propylene carbonate (PC), ethylene carbonate (EC), diethyl carbonate (DEC), dimethyl carbonate (DMC), ethyl methyl carbonate (EMC), etc., can be used as the nonaqueous medium. Moreover, one or more types of lithium compounds (lithium salts) selected, for example, from among $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$, etc., can be used as the supporting electrolyte.

Furthermore, the form (shape and size) of a lithium secondary battery constructed using as the positive electrode active material the lithium nickel cobalt manganese composite oxide disclosed herein is not particularly limited herein. The exterior can be a sheet type constituting a laminate film, etc., the battery can have a cylindrical or rectangular outer battery case, or the battery can be of a small button type.

Below a mode of use of the positive electrode active material disclosed herein is explained using as examples a lithium secondary battery (in this case, a lithium-ion battery) equipped with a wound electrode assembly, and a battery pack constructed using said battery as a component part (single cell) thereof, but the present invention is by no means limited to these embodiments.

It should also be noted that in the following drawings, all members and sites serving the same function are indicated by the same symbols, and redundant descriptions have been omitted or abbreviated. Moreover, the dimensional relationships (of length, width, height, etc.) in the drawings do not depict actual dimensional relationships.

As shown in FIG. 1, just as in single cells constituting prior art battery packs, a single cell 12 that is used as a constituent element of a battery pack 10 in the present embodiment comprises an electrode assembly typically comprising given battery constituent materials (respective active materials of the positive and negative electrodes, respective current collectors of the positive and negative electrodes, separator, etc.) in a container containing the same together with a suitable electrolyte. The battery pack 10 disclosed in this embodiment has single cells 12 having identical shapes (typically 10 or more cells, preferably about 10 to 30 cells, for example, 20 cells). The single cell 12 is housed in a container 14 (a flat box in the present embodiment) that can accommodate the flattened wound electrode assembly described below. The size (e.g., the thickness in the stacking direction, etc.) of each single cell 12 can differ because of dimensional errors during the manufacture of the container 14 that is used.

In the container 14, a positive terminal 15 that is electrically connected to the positive electrode of the wound electrode assembly and a negative terminal 16 that is electrically connected to the negative electrode thereof are provided. As illustrated, the positive terminal 15 of one single cell 12 and the negative terminal 16 of a neighboring single cell 12 are electrically connected with a coupler 17. A battery pack 10 of a desired voltage is constructed by connecting each single cell 12 in series in this manner.

Furthermore, a safety valve 13, etc., can be provided in the container 14 in the same manner as in conventional single cell battery containers in order to vent the gases that are generated within the container. The construction itself of the container 14 does not characterize the present invention, and therefore a detailed description is omitted.

The materials for the container 14 can be the same as those used in conventional single cell batteries and are not particularly limited herein. For example, a container made of metal (e.g., aluminum, steel, etc.) or a container made of plastic (e.g., a polyolefin resin such as polypropylene, or a resin with a high melting point such as polyethylene terephthalate, polytetrafluoroethylene, and polyamide; etc.) can preferably be used. The container 14 of the present embodiment is made of aluminum, for example.

Figure 2:
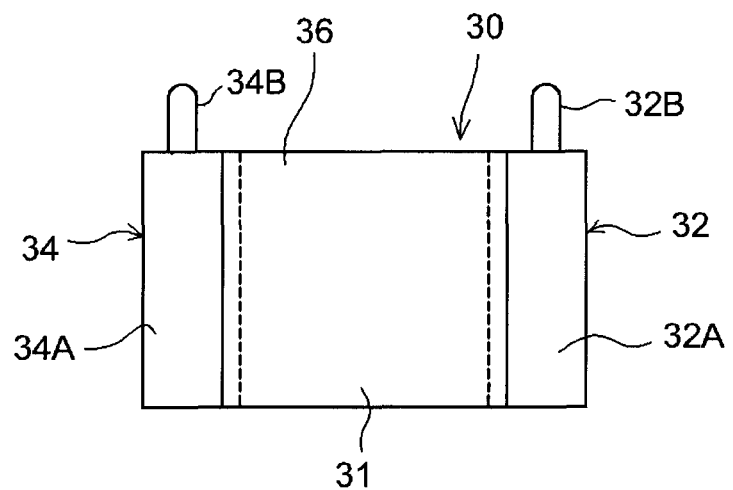
FIG. 2 is a front view schematically showing an example of a wound battery assembly.
Figure 3:
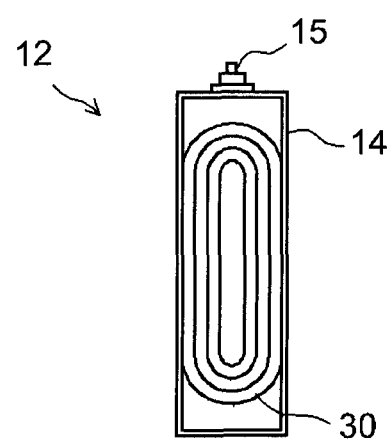
FIG. 3 is a cross-sectional view schematically showing the construction of a single cell comprising a battery pack.

As shown in FIGS. 2 and 3, in the same manner as in a wound electrode assembly of a normal lithium-ion battery, the single cell 12 is equipped with a flat wound electrode assembly 30 obtained by layering a sheet-shaped positive electrode 32 (hereafter, "positive electrode sheet 32") and a sheet-shaped negative electrode 34 (hereafter, "negative electrode sheet 34") together with two sheet-shaped separators 36 (hereafter, "separator sheet 36"), winding the positive electrode sheet 32 and negative electrode sheet 34 together at a slight offset, and compressing the resulting wound assembly in the lateral direction.

As shown in FIGS. 2 and 3, the respective edges of positive electrode sheet 32 and negative electrode sheet 34 partially protrude from the wound core component 31 (in other words, the component comprising the tightly wound positive electrode active material layered part of the positive electrode sheet 32, negative electrode active material layered part of the negative electrode sheet 34, and the separators 36) in the horizontal direction relative to the winding direction of wound electrode assembly 30 as a result of winding the two electrode sheets at a slight offset as noted above. Positive terminal lead 32B and negative terminal lead 34B are attached to the protruding positive electrode component (i.e., the part whereon a layer of the positive electrode active material was formed) 32A and the protruding negative electrode component (i.e., the part whereon a layer of the negative electrode active material was not formed) 34A, respectively, and said leads 32B and 34B are electrically connected to the positive terminal 15 and negative terminal 16, respectively.

With the exception of the lithium nickel cobalt manganese composite oxide of the present invention that is used as the positive electrode active material, the materials as well as the components themselves comprising the wound electrode assembly 30 of the abovementioned configuration can be the same as those in conventional electrode assemblies of lithium-ion batteries and are not particularly limited herein.

For example, positive electrode sheet 32 can be formed by adding a positive electrode active material layer for a lithium-ion battery to a continuous sheet positive current collector. Preferably a conductive material consisting of a metal with good conductivity is used as the positive current collector. For example, aluminum can be used. The shape of the positive current collector is not particularly limited herein because it can differ depending on the shape, etc., of the lithium secondary battery, and it can assume a variety of shapes such as a rod, plate, sheet, foil, mesh, and so on. In the present embodiment a sheet shaped positive current collector that can be suitably used in the lithium secondary battery (single cell) 12 equipped with the wound electrode assembly 30 is used. For example, an aluminum foil about 2 m to 4 m (e.g., 2.7 m) long, 8 cm to 12 cm (e.g., 10 cm) wide, and 5 µm to 20 µm (e.g., 15 µm) thick is used as the positive current collector, and on the surface thereof a positive electrode active material layer is formed by applying the paste for forming a positive electrode active material prepared by adding together and mixing a conductive material (e.g., carbon black), a binder (e.g., PTFE, CMC), and a positive electrode active material powder comprising a lithium nickel cobalt manganese composite oxide produced as described above (e.g., 85 mass % to 90 mass % lithium nickel cobalt manganese composite oxide, 5 mass % to 10 mass % acetylene black, 1 mass % to 5 mass % PTFE+CMC) in an aqueous medium. It should be noted that the aqueous medium is typically water, but it can be any medium exhibiting aqueous properties, e.g., an aqueous solution containing a lower grade alcohol (methanol, ethanol, etc.). More specifically, the paste can preferably be applied to the surface of the positive current collector by using a suitable coating device such as a gravure coater, a slit coater, a die coater, or a comma coater. Then after applying the paste, the solvent (typically water) contained therein is dried off, and a positive electrode active material layer is formed by compression (with a press). Prior art, well-known pressing methods such as roll pressing and plate pressing can be used as the pressing method. When adjusting the thickness of the positive electrode active material layer, the thickness can be measured with a coating thickness gauge and multiple pressings can be performed while adjusting the pressing pressure until the desired thickness is achieved.

On the other hand, the negative electrode sheet 34 can be formed by adding a negative electrode active material layer for a lithium-ion battery to a continuous sheet negative current collector. Preferably a conductive material consisting of a metal with good conductivity is used as the negative current collector. For example, copper can be used. The shape of the negative current collector is not particularly limited herein because it can differ depending on the shape, etc., of the lithium secondary battery, and it can assume a variety of shapes such as a rod, plate, sheet, foil, mesh, and so on. In the present embodiment a sheet shaped negative current collector that can be suitably used in the lithium secondary battery (single cell) 12 equipped with wound electrode assembly 30 is used. For example, a copper foil about 2 m to 4 m (e.g., 2.9 m) long, 8 cm to 12 cm (e.g., 10 cm) wide, and 5 µm to 20 µm (e.g., 10 µm) thick is used as the negative current collector, and on the surface thereof a negative electrode active material layer can be preferably formed by applying a paste for forming a negative active material layer prepared by adding together and dispersing or dissolving a suitable negative electrode active material (graphite, etc.) and a binder, etc., in a suitable solvent (water, an organic solvent, or a mixed solvent thereof) (e.g., 94 mass % to 98 mass % graphite, 1 mass % to 3 mass % SBR, 1 mass % to 3 mass % CMC), drying off the solvent, and pressing. The process of layer formation per se is omitted in this description because it is the same as that used for the positive electrode active material layer.

Moreover, a porous polyolefin resin sheet can be noted as an example of the separator sheet 36 that is preferably used between positive and negative electrode sheets 32 and 34. For example, a porous synthetic resin separator sheet (for example, polyolefin resin such as polyethylene) about 2 m to 4 m (e.g., 3.1 m) long, 8 cm to 12 cm (e.g., 11 cm) in wide, and 5 µm to 30 µm (e.g., 25 µm) thick can be preferably used.

It should be noted that when a solid electrolyte or a gel electrolyte is used as the electrolyte, a separator is unnecessary (in other words, in such cases the electrolyte itself can function as the separator).

The single cell 12 can be constructed by housing the obtained flat wound electrode assembly 30 laid on its side in relation to the winding axis as shown in FIG. 3 in the container 14 and injecting and sealing therein a nonaqueous electrolyte (electrolyte solution) such as a mixed solvent of diethyl carbonate and ethylene carbonate (e.g., in a mass ratio of 1:1) containing a suitable amount (e.g., a 1 M concentration) of a suitable supporting electrolyte (e.g., a lithium salt such as $LiPF_6$).

As shown in FIG. 1, a plurality of identical single cells 12 constructed as described above are aligned lengthwise in the container 14 (i.e., the surface corresponding to the flattened surfaces of the wound electrode assemblies 30 described below that are housed within container 14) and reversed such that the respective positive terminal 15 of one alternates with the negative terminal 16 of the next. In between said aligned single cells 12 and on both outer sides in the single cell alignment direction (stacking direction), cooling plates 11 of a given shape are tightly arranged across the width of container 14. These cooling plates 11 function as a heat diffusive material in order to effectively diffuse the heat generated within each of the single cells during use, and preferably they have a shape that permits the flow of a cooling fluid (typically air) between the single cells 12. Alternatively, the cooling plates 11 can preferably be made from a metal with good thermal conductivity, or a hard lightweight polypropylene or other synthetic resin.

Endplates 18 and 19 in a pair are configured on the outside surfaces of the cooling plates 11 arranged on both outer sides of the aligned single cells 12 and cooling plates 11 (hereafter, these are collectively referred to as a "single cell group"). Moreover, one or several spacer sheets 40 can be inserted as a means of length adjustment between the outside cooling plate 11 and endplate 18 on one side of the single cell group (right edge of FIG. 2). It should also noted that the material of spacer 40 is not particularly limited herein, and several varieties of materials (metals, plastics, ceramics, etc.) can be used provided it demonstrates the thickness adjustment function described below. From the perspective of durability to impacts, etc., preferably a metal material or a plastic material, for example, a lightweight polyolefin resin spacer 40 can be used.

Then the whole assembly of the single cell group with single cells 12 arranged in the stacking direction, a spacer 40, and endplates 18 and 19 is bound with a given confining pressure P in said stacking direction by means of a restraining band 21 for fastening purposes such that both endplates 18 and 19 are clamped. More specifically, the single cell group is bound in the stacking direction thereof such that a given confining pressure P is applied (e.g., such that the contact pressure on the surface of the container 14 is about 0.1 MPa to 10 MPa) by fastening and fixing the end of the restraining band 21 to the endplate 18 with a screw 22, as shown in FIG. 1. In a battery pack 10 bound with said confining pressure P, confining pressure is also applied to the wound electrode assembly 30 within the container 14 of each single cell 12, and the deterioration of battery performance caused by the accumulation of gases generated in the wound electrode assembly 30 (e.g., between positive electrode sheet 32 and negative electrode sheet 34) in the container 14 can be prevented.

In the following test examples, a lithium secondary battery (sample battery) was constructed using the lithium nickel cobalt manganese composite oxide disclosed herein as the positive electrode active material, and a performance evaluation thereof was conducted.

Test Example 1

Production of the Lithium Nickel Cobalt Manganese Composite Oxide

An aqueous sulfate solution was prepared by mixing nickel sulfate as the nickel source, cobalt sulfate as the cobalt source, and manganese sulfate as the manganese source in a given molar ratio. Next, a slurry was produced by adjusting the pH to 11 while supplying small amounts of an aqueous ammonia solution and an aqueous sodium hydroxide solution thereto while heating at approximately 50° C. This slurry was filtered and rinsed with water, and then a powder consisting of a nickel cobalt manganese composite oxide was obtained by drying the solids at approximately 70° C.

Next, a lithium carbonate powder with a mean particle size of approximately 20 μm as the lithium source was mixed into the abovementioned nickel cobalt manganese composite oxide powder such that a given molar ratio ($Li/M_{all}$) between lithium (Li) and the total ($M_{all}$) of all of the constituent metallic elements (Ni, Co, Mn) was achieved. Then the mixture was put into an environment wherein the temperature was increased from room temperature to the temperature region of 720° C. to 780° C. over a period of approximately 6 hours, and the mixture was calcined in said temperature region (typically 750° C.) for approximately 12 hours. Next, the temperature was increased to the temperature region of 800° C. to 1000° C. over a period of approximately 6 hours, and the mixture was calcined in said temperature region (typically 900° C.) for approximately 24 hours. After this calcining process, a lithium nickel cobalt manganese composite oxide powder of a stratified structure having lithium, nickel, cobalt, and manganese as the essential constituent elements was obtained by powdering the calcined material.

It should also noted that in this test different lithium nickel cobalt manganese composite oxide powders were synthesized based on the above calcining schedule by altering the content of the lithium source (in this case, lithium carbonate) such that molar ratios of 1.01, 1.03, 1.05, 1.06, 1.07, 1.1, 1.15, and 1.2 were obtained for $Li/M_{all}$.

Figure 4:
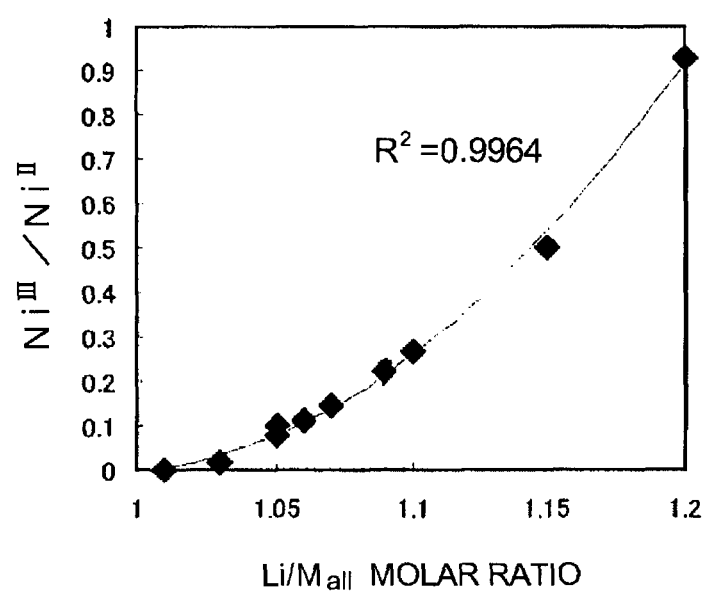
FIG. 4 is a graph that shows the relationship between the $Li/M_{all}$ molar ratio and $Ni^{III}/Ni^{II}$ for a lithium nickel cobalt manganese composite oxide produced as a test example wherein the horizontal axis is the $Li/M_{all}$ ratio of the starting materials, and the vertical axis is $Ni^{III}/Ni^{II}$.

XANES (X-ray Absorption Near Edge Structure) analysis was performed for each of the obtained lithium nickel cobalt manganese composite oxide powders, and the valence as well as the ratio ($Ni^{III}/Ni^{II}$) of the nickel atoms (nickel ions) contained in each composite oxide were investigated in this test. The results are shown in FIG. 4. In this graph the horizontal axis is the molar ratio of Li to $M_{all}$ ($Li/M_{all}$) in the starting materials, and the vertical axis is the value of $Ni^{III}/Ni^{II}$ derived by calculating the ratio from the results of the XANES analysis.

As can clearly be seen from the graph shown in FIG. 4, a lithium nickel cobalt manganese composite oxide with a desired $Ni^{III}/Ni^{II}$ ratio can be produced by increasing the molar ratio ($Li/M_{all}$) of Li to $M_{all}$ (i.e., by adding an excess of the Li source) and by calcining according to the above calcining schedule. In particular, it was found that an $Ni^{III}/Ni^{II}$ ratio of 0.15 or higher can be obtained by increasing $Li/M_{all}$ to 1.07 or higher. Furthermore, it was found that an $Ni^{III}/Ni^{II}$ ratio of 0.25 or higher can be obtained by increasing $Li/M_{all}$ to 1.1 or higher.

Test Example 2

Measurement of Volume Resistivity

Figure 5:
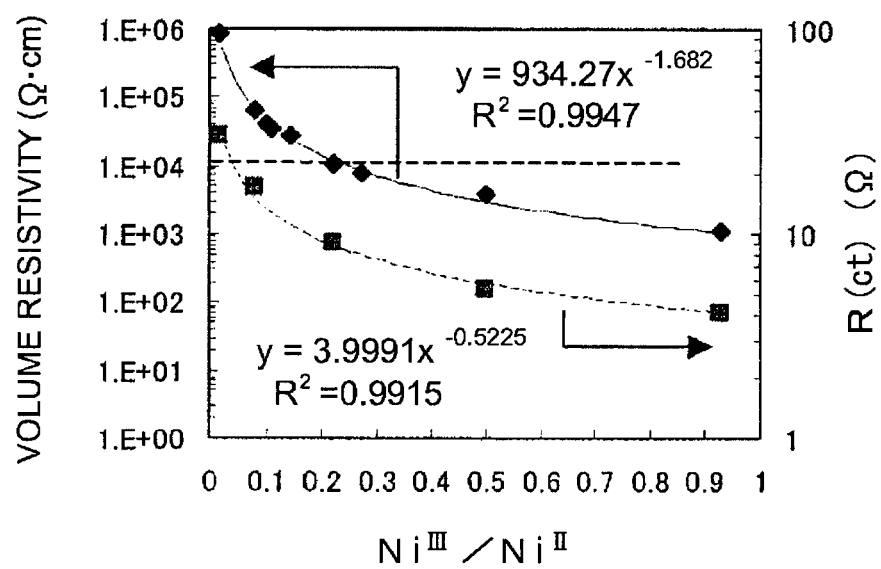
FIG. 5 is a graph showing the volume resistivity ($\Omega \cdot cm$) of a lithium nickel cobalt manganese composite oxide produced as a test example and the reactive impedance ($\Omega$) of a test sample made using said lithium nickel cobalt manganese composite oxide wherein the horizontal axis is the $Ni^{III}/Ni^{II}$ of the tested lithium nickel cobalt manganese composite oxide, the left vertical axis is the volume resistivity ($\Omega \cdot cm$), and the right vertical axis is the reactive impedance (Rct; $\Omega$)

The volume resistivity of each of the lithium nickel cobalt manganese composite oxides produced in Test Example 1 was measured. In particular, the volume resistivity was measured with a commercially available powder resistivity measurement device under a pressure of 60 MPa. The results are shown in FIG. 5. In this graph the horizontal axis is the value of the $Ni^{III}/Ni^{II}$ ratio of the tested lithium nickel cobalt manganese composite oxides, and the left side of the vertical axis is the volume resistivity (Ω·cm).

As can clearly be seen from the graph shown in FIG. 5, it was confirmed that a decrease in volume resistivity accompanies an increase in $Ni^{III}/Ni^{II}$ values. In particular, the volume resistivity was $5 \times 10^4$ Ω·cm or lower when the value of $Ni^{III}/Ni^{II}$ was 0.15 or higher. Furthermore, an extremely low volume resistivity of $1 \times 10^4$ Ω·cm or lower (typically 1×10³ Ω·cm to 1×10⁴ Ω·cm) was realized when the value of Ni$^{III}$/Ni$^{II}$ was 0.2 or higher (more preferably 0.25 or higher).

Test Example 3

Measurement of Reactive Impedance (Rct)

Each of the lithium nickel cobalt manganese composite oxide powders produced in Test Example 1 were used as positive electrode active materials, and test lithium-ion batteries were constructed. Then an AC impedance measurement was performed for each test battery, and the reactive impedance (Ω) of the batteries was evaluated. The test lithium-ion batteries were produced as described below.

First, 90 mass % of a lithium nickel cobalt manganese composite oxide as the positive electrode active material, 5 mass % acetylene black as the conductive material, and 5 mass % PVDF (solid) as the positive electrode binder were dispersed in a suitable solvent (NMP: N-methyl-pyrrolidone), and a paste for forming a positive electrode active material layer was prepared by mixing for 1 hour with a dual axis mixer. This paste was applied to the positive current collector (an aluminum foil about 15 μm thick), and the solvent was evaporated by pressing to produce test positive electrodes having a positive electrode active material layer approximately 50 μm thick formed on one surface of a positive current collector.

Conversely, 95 mass % scaly graphite as the negative electrode active material and 5 mass % PVDF (solid) as the negative electrode binder were dispersed in a suitable solvent (NMP), and a paste for forming a negative electrode active material layer was prepared by mixing for 1 hour with a dual axis mixer. This paste was applied to the negative current collector (a copper foil about 10 μm thick) and the solvent was evaporated by pressing to produce test negative electrodes having a negative electrode active material layer approximately 60 μm thick formed on one surface of a negative current collector.

Next, an electrode assembly was produced by layering the test positive electrode and negative electrode interposed with a microporous polyethylene separator about 25 μm thick. Then the resulting laminated electrode assemblies were placed in battery cases, and test batteries were constructed by injecting an electrolyte solution into the battery cases. A mixed solvent with a 1:1 (mass ratio) of ethylene carbonate (EC) to diethyl carbonate (DEC) in which approximately 1 M LiPF$_6$ had been dissolved was used as the electrolyte solution.

The AC impedance of the lithium-ion batteries fabricated in this manner was measured, and the reactive impedance (Rct; Ω) was evaluated. For the AC impedance measurement conditions, the applied AC voltage was 10 mV and the frequency range was 0.001 Hz to 100,000 Hz. The results are shown in FIG. 5. In this graph, the horizontal axis is the Ni$^{III}$/Ni$^{II}$ value of the tested lithium nickel cobalt manganese composite oxides, and the right side of the vertical axis is the reactive impedance (Rct; Ω).

As can be clearly seen from the graph shown in FIG. 5, just as in the case of volume resistivity, it was confirmed that a decrease in reactive impedance accompanies an increase in Ni$^{III}$/Ni$^{II}$ value. In the tested batteries the reactive impedance decreased rapidly to about 10Ω to 20Ω when the value of Ni$^{III}$/Ni$^{II}$ was 0.15 or higher. Furthermore, an extremely low reactive impedance of 10Ω or lower (typically 2Ω to 10Ω) was realized when the value of Ni$^{III}$/Ni$^{II}$ was 0.2 or higher (more preferably 0.25 or higher).

Test Example 4

Production of a Zirconium Containing Lithium Nickel Cobalt Manganese Composite Oxide and Use Thereof A number of lithium nickel cobalt manganese composite oxides were produced by the same method as in Test Example 1. Specifically, a composite oxide containing zirconium (Zr) as an additive was produced. In particular, an aqueous sulfate solution was prepared by mixing nickel sulfate as the nickel source, cobalt sulfate as the cobalt source, manganese sulfate as the manganese source, and zirconium sulfate tetrahydrate as the zirconium source such that the molar ratio Ni:Co:Mn:Zr was 3:3:3:1. Next, a slurry was produced by adjusting the pH to 11 to 12 while supplying small amounts of an aqueous ammonia solution and an aqueous sodium hydroxide solution thereto while heating at approximately 50° C. This slurry was filtered and rinsed with water, and then a powder consisting of nickel cobalt manganese zirconium composite oxide was obtained by drying the solids at approximately 70° C.

Next, a lithium carbonate powder with a mean particle size of approximately 20 μm as the lithium source was mixed into the above nickel cobalt manganese zirconium composite oxide powder such that the molar ratio (Li/M$_{all}$) between Li and the total (M$_{all}$) of all of the other constituent metallic elements (Ni, Co, Mn, Zr) was 1.15. Then, the mixture was put into an environment wherein the temperature was increased from room temperature to the temperature region of 720° C. to 780° C. over a period of approximately 6 hours, and the mixture was calcined in said temperature region (typically 750° C.) for approximately 12 hours. Next, the temperature was increased to the temperature region of 800° C. to 1000° C. over a period of approximately 6 hours, and the mixture was calcined in said temperature region (typically 900° C.) for approximately 24 hours. After this calcining process, a composite oxide powder of a stratified structure having lithium, nickel, cobalt, manganese, and zirconium as the essential constituent elements was obtained by powdering the calcined material.

For comparison, lithium nickel cobalt manganese composite oxide powders not containing zirconium were produced by a similar process. Specifically, a total of three varieties of lithium nickel cobalt manganese composite oxide powders not containing zirconium were produced wherein the molar ratio (Li/M$_{all}$) between Li and the total (M$_{all}$) of all of the other constituent metallic elements (Ni, Co, Mn) was 1.05, 1.10, and 1.15, respectively.

Then, the volume resistivity and reactive impedance were investigated as in Test Example 2 and Test Example 3 using these four types of composite oxide powders. Moreover, the specific surface area (m²/g) and the mean particle size (i.e., the median size (d50: μm) of the aggregate particles) of these four types of composite oxide powders were investigated based upon the BET method and the laser diffraction/dispersion method, respectively.

The results are shown in Table 1 and Table 2.

TABLE 1

|  | Constituent Elements | Li/M$_{all}$ ratio | Ni$^{III}$/Ni$^{II}$ | d50 (μm) | BET specific surface area (m²/g) |
|---|---|---|---|---|---|
| Sample 1 | Li(NiCoMn)O$_2$ | 1.05 | 0.08 | 5.4 | 0.82 |
| Sample 2 | Li(NiCoMn)O$_2$ | 1.10 | 0.27 | 5.6 | 0.75 |
| Sample 3 | Li(NiCoMn)O$_2$ | 1.15 | 0.51 | 5.7 | 0.71 |
| Sample 4 | Li(NiCoMnZr)O$_2$ | 1.15 | 0.50 | 5.4 | 0.98 |

TABLE 2

| | Constituent elements | Volume resistivity ($\Omega \cdot m$) | Reactive impedance ($\Omega$) |
|---|---|---|---|
| Sample 1 | Li(NiCoMn)O$_2$ | $3.894 \times 10^4$ | 17 |
| Sample 2 | Li(NiCoMn)O$_2$ | $7.710 \times 10^3$ | 8.9 |
| Sample 3 | Li(NiCoMn)O$_2$ | $3.755 \times 10^3$ | 5.4 |
| Sample 4 | Li(NiCoMnZr)O$_2$ | $4.622 \times 10^3$ | 4.8 |

As shown in Table 1 and Table 2 above, the zirconium-containing lithium nickel cobalt manganese composite oxide obtained in this test example had almost the same characteristics as the lithium nickel cobalt manganese composite oxide that did not contain zirconium. Therefore, it was confirmed that additive metallic elements such as Zr (or metalloids) can be included when the percentage of all of the constituent metallic elements excluding lithium is 20 atomic % or lower (preferably 10 atomic % or lower).

The present invention was described by preferred embodiments above, but such a description is not a limiting condition in the present invention, and of course a variety of modifications thereof are possible.

Figure 6:
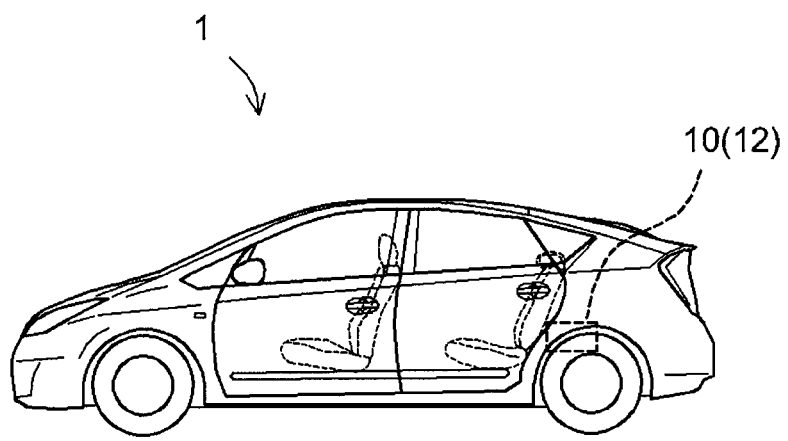
FIG. 6 is a side view schematically showing a vehicle equipped with a lithium secondary battery.

Both the lithium secondary battery 12 and the battery pack 10 disclosed herein have suitable characteristics as batteries for vehicles and have excellent high-rate charge and discharge characteristics in particular. Therefore, as shown in FIG. 6, the present invention provides a vehicle 1 equipped with any of the lithium secondary batteries 12 (the battery pack 10) disclosed herein. More specifically, the present invention provides a vehicle (e.g., an automobile) equipped with the lithium secondary battery 12 as a power source (typically, as a power source for a hybrid vehicle or an electric vehicle).

Moreover, examples of preferred applications of the technology disclosed herein include: a lithium secondary battery 100, which is expected to be usable at an operating cycle that includes a high-rate discharge of 50 A or higher (e.g., 50 A to 250 A) and further of 100 A or higher (e.g., 100 A to 200 A); and a high capacitance type lithium secondary battery with a theoretical capacitance of 1 Ah or higher (also 3 Ah or higher), which is expected to be usable at an operating cycle that includes high-rate discharge at 10 C or higher (e.g., 10 C to 50 C) and further at 20 C or higher (e.g., 20 C to 40 C), etc.

INDUSTRIAL APPLICABILITY

The present invention provides a positive electrode active material with excellent electron conductivity. Therefore, the present invention can provide lithium secondary batteries with low internal resistance by using this positive electrode active material. In particular, the present invention provides lithium secondary batteries (e.g., lithium secondary batteries that can be used in vehicles as the driving power source of the vehicle) with excellent high-rate charge and discharge characteristics.

The invention claimed is:

1. A process for producing a positive electrode active material for a lithium secondary battery formed of substantially a lithium nickel cobalt manganese composite oxide of a stratified structure having lithium, nickel, cobalt, and manganese as essential constituent elements, the method comprising:

a step of preparing a starting material, which contains a lithium source, a nickel source, a cobalt source, and a manganese source, for production of a composite oxide where said starting material is prepared such that a molar ratio (Li/M$_{all}$) between lithium (Li) and a total amount of all of other constituent metallic elements (M$_{all}$) is $1.07 \leq \text{Li}/M_{all} \leq 1.2$; and a step of producing said composite oxide, with at least a portion of nickel atoms being trivalent nickel atoms (Ni$^{III}$), and this step being executed by first calcining said starting material at an intermediate calcination temperature established in a temperature range of 700° C. or higher but less than 800° C., and then calcining by increasing to a maximum calcination temperature established in the temperature range between 800° C. and 1000° C. that is 100° C. or more higher than said intermediate calcination temperature, wherein said composite metal oxide is a lithium nickel cobalt manganese composite oxide represented by the following formula:

$$\text{Li}_x(\text{Ni}^{II}_y\text{Ni}^{III}_z)_a\text{CO}_b\text{Mn}_c\text{Me}_d\text{O}_2 \qquad (1)$$

where, a, b, c, and d are numbers that satisfy all of the following relationships:
$0.9 \leq a+b+c+d \leq 1.1$;
$0.9 \leq b/a \leq 1.1$;
$0.9 \leq c/b \leq 1.1$;
$0.9 \leq a/c \leq 1.1$; and
$0 \leq d \leq 0.1$;

x is a number that satisfies the relationship $1.07 \leq x/(a+b+c+d) \leq 1.2$;

y and z are numbers that satisfy the relationship $0.15 \leq z/y \leq 0.95$; and Me is either absent, or is one or more elements selected from a group consisting of Mg, Sr, Ti, Zr, V, Nb, Mo, W, B, and Al, and said starting material is prepared comprising a lithium source, nickel source, cobalt source, and manganese source at a molar ratio established so that the complex metal oxide represented by said Formula (1) is produced by said calcination.

2. The production process according to claim 1, wherein x in said Formula (1) is a number that satisfies the relationship $1.1 \leq x/(a+b+c+d) \leq 1.2$.

3. The production process according to claim 1, comprising:

a first calcination step of performing calcination by increasing the temperature from room temperature to a temperature region of 700° C. or higher but less than 800° C. over a period of 1 hour to 10 hours, and said calcination is performed for 1 hour to 24 hours at said intermediate calcination temperature; and a second calcination step of performing calcination by increasing the temperature to a temperature region between 800° C. and 1000° C. over a period of 1 hour to 10 hours, and said calcination is performed for 1 hour to 24 hours at said maximum calcination temperature.

4. A lithium secondary battery comprising a positive electrode including the positive electrode active material produced by the production process according to claim 1.

5. A vehicle comprising the lithium secondary battery according to claim 4.

* * * * *